United States Patent
Kim et al.

(10) Patent No.: US 9,169,762 B2
(45) Date of Patent: Oct. 27, 2015

(54) HYDRO-CARBON INJECTION SUPPLY UNIT

(75) Inventors: Jiho Kim, Seoul (KR); Sukil Park, Hwaseong-si (KR); Joungwoo Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 632 days.

(21) Appl. No.: 13/528,456

(22) Filed: Jun. 20, 2012

(65) Prior Publication Data

US 2013/0133619 A1 May 30, 2013

(30) Foreign Application Priority Data

Nov. 29, 2011 (KR) .................. 10-2011-0125881

(51) Int. Cl.
*F01N 3/36* (2006.01)
*F02M 37/22* (2006.01)

(52) U.S. Cl.
CPC .............. *F01N 3/36* (2013.01); *F02M 37/22* (2013.01); *F02M 2037/226* (2013.01); *Y02T 10/20* (2013.01)

(58) Field of Classification Search
CPC .............. F02M 63/0225; F02M 55/04; F02M 2037/226; F02D 2041/389; F01N 3/36
USPC ............ 123/446, 447, 456, 457; 60/286, 299, 60/302, 303
See application file for complete search history.

(56) References Cited

U.S. PATENT DOCUMENTS

| | | | |
|---|---|---|---|
| 2007/0283934 A1* | 12/2007 | Okamura | 123/495 |
| 2008/0035555 A1* | 2/2008 | Blizard et al. | 210/443 |
| 2008/0053078 A1* | 3/2008 | Chrisman et al. | 60/299 |
| 2009/0271096 A1* | 10/2009 | Matsubara | 701/113 |
| 2010/0037600 A1* | 2/2010 | Doring | 60/297 |
| 2011/0162622 A1* | 7/2011 | Kojima et al. | 123/457 |
| 2012/0132177 A1* | 5/2012 | Kristen et al. | 123/456 |

FOREIGN PATENT DOCUMENTS

| | | | | |
|---|---|---|---|---|
| JP | 2011-236874 A | 11/2011 | | |
| KR | 10-2001-0005173 A | 1/2001 | | |
| KR | 10-2003-0068396 A | 8/2003 | | |
| KR | 10-2004-0000851 A | 1/2004 | | |
| KR | 10-2005-0029467 A | 3/2005 | | |
| WO | WO 2008134751 A1 * | 11/2008 | | F01N 3/025 |
| WO | WO 2010028888 A1 * | 3/2010 | | |

* cited by examiner

*Primary Examiner* — Thomas Moulis
*Assistant Examiner* — Joseph Dallo
(74) *Attorney, Agent, or Firm* — Morgan, Lewis & Bockius LLP

(57) ABSTRACT

A hydro-carbon injection supply unit includes a fuel filter including a damping head which reduces a high fuel pulsation pressure generated in a cylinder head through an inner circulation path along of the fuel, and an HCI part for receiving the fuel discharged from the fuel filter whose pulsation pressure has been reduced and injecting the fuel to an exhaust manifold at a front end of a catalyst. Accordingly, even if a fuel pulsation pressure exceeding a design value is generated in the cylinder head, the HCI part is not influenced at all.

4 Claims, 4 Drawing Sheets

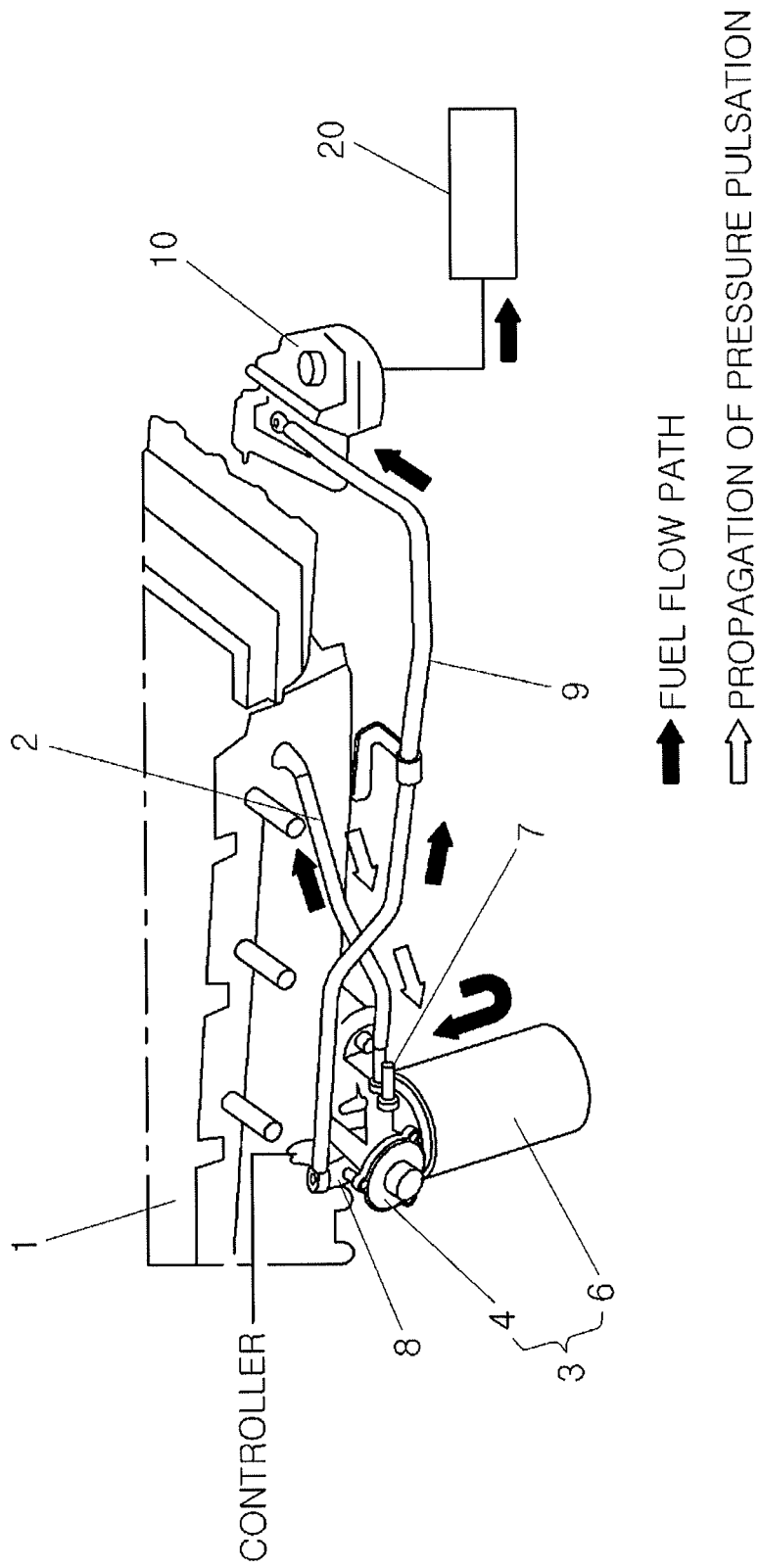

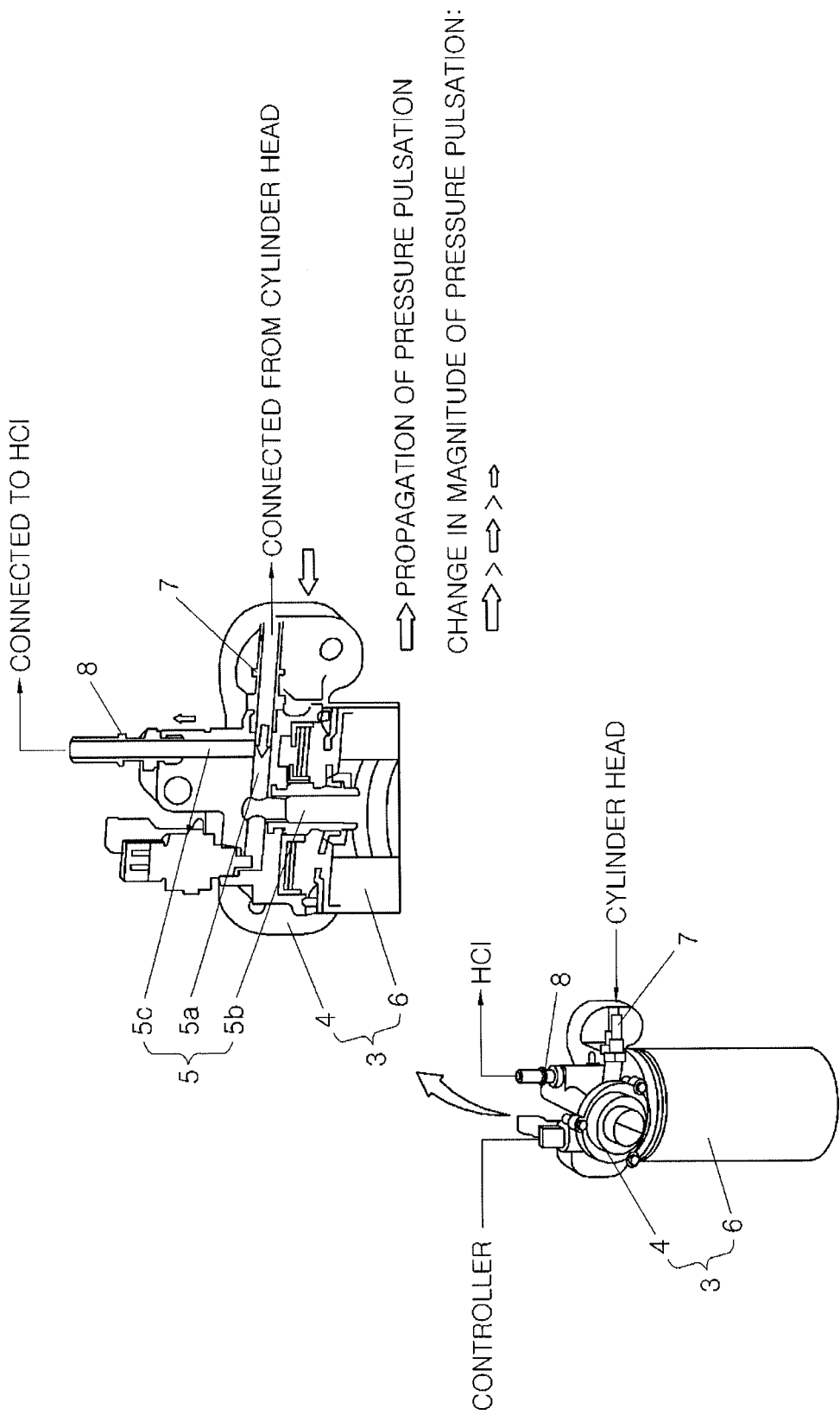

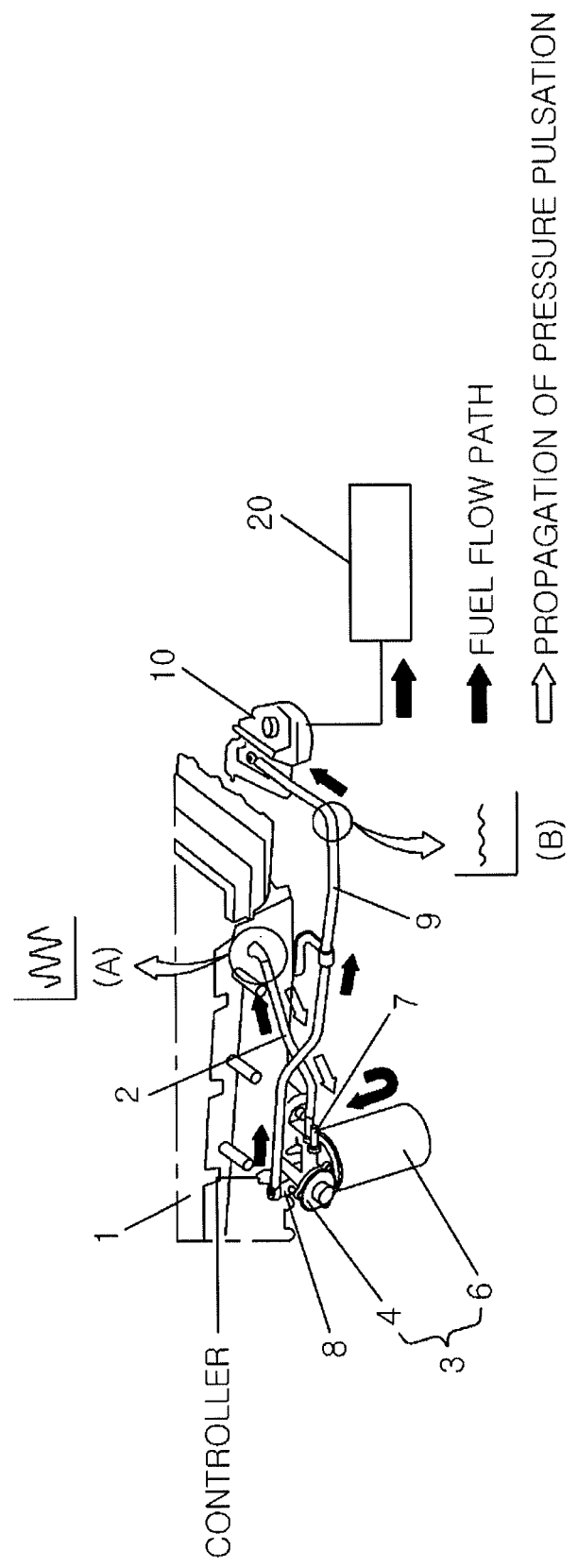

HYDRO-CARBON INJECTION SUPPLY UNIT

CROSS-REFERENCE TO RELATED APPLICATIONS

The present application claims priority of Korean Patent Application Number 10-2011-0125881 filed Nov. 29, 2011, the entire contents of which application is incorporated herein for all purposes by this reference.

BACKGROUND OF INVENTION

1. Field of Invention

The present invention relates to a hydro-carbon injection supply unit, and more particularly, to a hydro-carbon injection supply unit which, when a high pressure pulsation is generated in a cylinder head due to a fuel reversed during an operation of an injector, prevents the high pressure pulsation from badly influencing a hydro-carbon injection (HCI) part.

2. Description of Related Art

In general, a hydro-carbon injection (HCI) supply unit refers to a unit for injecting a fuel using an injector mounted to a front end of a diesel oxidization catalyst (DOC) to increase a temperature of exhaust gas passing through a diesel particle filter (DPF).

That is, the HCI unit increases a temperature of exhaust gas while a fuel injected to an exhaust manifold is being burned to oxidize particulate matters (PMs) collected by the DPF, thereby reproducing the DPF.

Here, the reproduction of the DPF means that stuck sooty smoke is burned so that the DPF can be prevented from being blocked and converted into a state where the DPF can be reused.

A unit for this purpose is generally referred to as a hydro-carbon injection supply unit.

An example of the hydro-carbon injection supply unit is configured such that a cylinder head and a fuel filter are connected to a fuel feed line and a fuel is supplied through a HCI feed line branched out from the fuel feed line to be injected to an exhaust manifold at a front end of a catalyst.

Accordingly, the HCI supply unit injects a fuel supplied from a fuel filter 3 to an exhaust manifold with an injector depending on a control condition, so that a temperature of the exhaust gas flowing into the exhaust manifold is increased due to a reaction promotion with a catalyst, making it possible to oxidize the PMs collected by the DPF.

As a result, the DPF having the collected PMs is reproduced through oxidization of the PMs, and the state of the DPF can be converted into a state where the DPF can be reused.

However, in the case of the above-discussed hydro-carbon injection supply unit, a layout where an HCI feed line is branched out from a fuel feed line is formed.

In such a layout, a head discharge pressure pulsation is generated inside a cylinder head by a fuel reversed during an operation of an injector, and the head discharge pressure pulsation itself cannot but be transferred to an HCI pressure pulsation.

The head discharge pressure pulsation is unavoidable in some aspects due to an operation of the injector of the fuel supply system, and the HCI pressure pulsation due to the head discharge pressure pulsation is also inevitable in view of propagation along a fuel flow.

However, when pressure propagates at more than 2.8 bar exceeding 2.5 bar which is a design standard for pressure pulsation, the fuel system is badly influenced.

As an example, if a fuel pulsation at more than approximately 2.8 bar exceeding a design standard is excessively generated, the stability of fuel rail pressure is disturbed and fuel injection uniformity cannot but be lowered. As a result, parts of a fuel system cannot but be damaged.

In particular, due to a tendency toward a strictness of a management standard for fuel efficiency/exhaustion and an increase in emphasis on control of fuel amount, a need to properly manage a pulsation pressure of a fuel system cannot help but significantly increase.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a hydro-carbon injection supply unit by which a fuel filter connecting a fuel flow path formed between a cylinder head and a hydro-carbon injection (HCI) part further realizes a pulsation absorbing and damping operation, making it possible to significantly reduce an initial high pressure pulsation generated in the cylinder head and accordingly always maintain the pressure pulsation propagating to the HCI part below a design value.

Various embodiments of the present invention provides a hydro-carbon injection supply unit, including a fuel filter connected to a cylinder head so that a pressure pulsation having propagated from the cylinder head is introduced thereinto and including a damping head which reduces the propagated pressure pulsation through an inner circulation path along which the introduced fuel passes and discharges the fuel to the outside, and an HCI part to which the reduced pressure pulsation is supplied together with the fuel discharged from the fuel filter and the supplied fuel is injected to an exhaust manifold at a front end of a catalyst.

The fuel filter may include a filter housing equipped with a filter for filtering foreign substances of the fuel therein, and the damping head coupled to the filter of the filter housing to be communicated with the filter of the filter housing may be connected to a fuel feed line for supplying the fuel to the cylinder head and may be connected to an HCI feed line for supplying the fuel to the HCI part.

When a head discharge pressure pulsation generated in the cylinder head propagates, a fuel circulation path for lowering the head discharge pressure pulsation to an HCI pressure pulsation lower than a design value may be formed in the damping head, and the fuel circulation path may form a damping path.

The damping path may include a fuel supply passage formed in parallel to a longitudinal cross-section of the damping head to form a fuel flow passage, a fuel connecting passage communicated with the fuel supply passage and connected to the filter housing, and an HCI discharge passage communicated with the fuel supply passage on an opposite side of the fuel connecting passage.

The fuel connecting passage and the HCI discharge passage may have layouts perpendicular to the fuel supply passage parallel to the longitudinal cross-section of the damping head, respectively.

The fuel supply passage may include a fuel feed connector for connection of the fuel feed line, and the HCI discharge passage may include an HCI feed connector for connection of the HCI feed line.

The fuel feed connector may be integrally formed with the fuel supply passage, and the HCI feed connector may be integrally formed with the HCI discharge passage.

According to various embodiments of the present invention, a high pressure pulsation generated in the cylinder head becomes remarkably low due to an operation of the fuel filter while propagating to the HCI part, making it possible to prevent a fuel pulsation pressure from being exceeding a design value.

Further, since the HCI part is operated at a fuel pulsation pressure not exceeding a design value, the stability of fuel rail pressure and the uniformity in fuel injection cannot be badly influenced and parts of a fuel system can be prevented from being damaged.

In addition, since a pressure pulsation propagation path extending from the cylinder head to the HCI part by means of the fuel filter maintains a low pulsation pressure, a high management standard for fuel efficiency/exhaustion and an improvement of performance of control of fuel amount can be properly satisfied.

The methods and unites of the present invention have other features and advantages which will be apparent from or are set forth in more detail in the accompanying drawings, which are incorporated herein, and the following Detailed Description of the Invention, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a view showing an exemplary hydro-carbon injection supply unit according to the present invention.

FIG. 2 is a view showing an interior of an exemplary damping head constructed together with an exemplary fuel filter according to the present invention.

FIGS. 3A and 3B show an exemplary operation of a hydro-carbon injection supply unit according to the present invention and a noise graph.

Figure 3B:
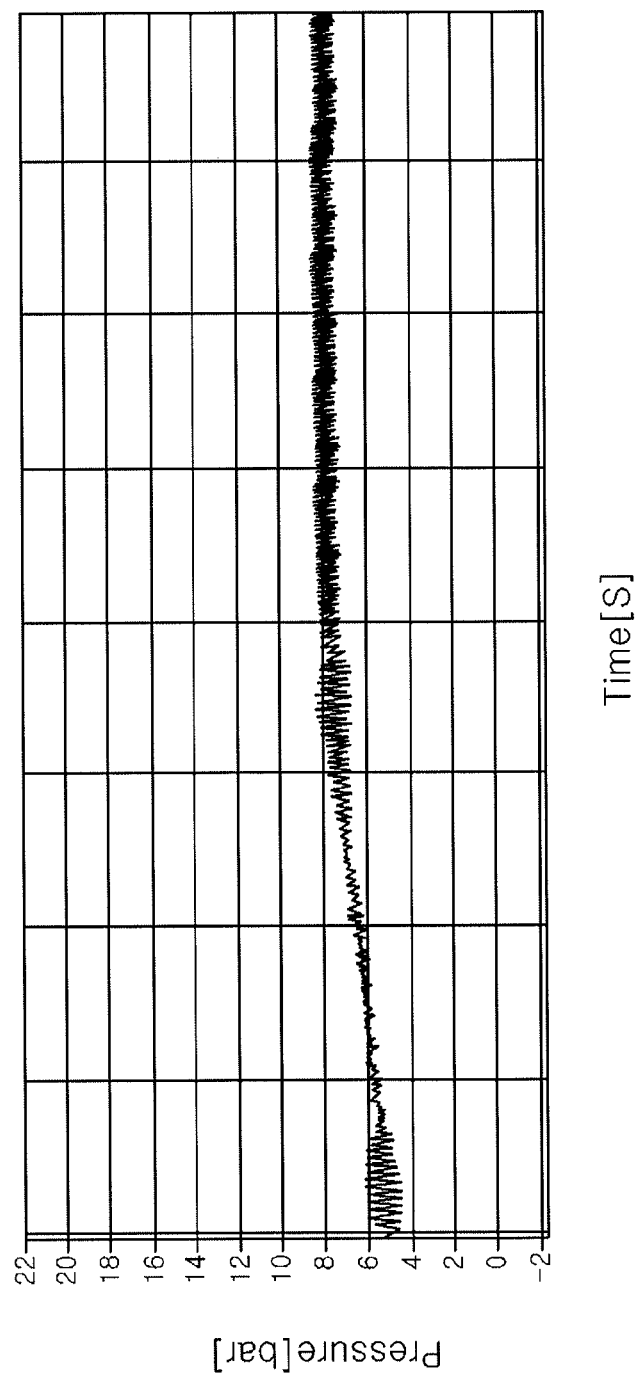

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a hydro-carbon injection supply unit includes a fuel feed line 2 for supplying a fuel to a cylinder head 1 while forming a path along which a pressure pulsation propagates from cylinder head 1 on the other hand, a fuel filter 3 for filtering foreign substances contained in the supplied fuel and discharging the purified fuel to fuel feed line 2, a damping head 4 for forming a circulation path for propagation of the fuel introduced into fuel filter 3 and absorbing and reducing a pulsation pressure having propagated from cylinder head 1 as well, and a hydro-carbon injection (HCI) feed line 9 connected to an HCI part 10 for receiving the fuel flowing out from fuel filter 3, whose pulsation pressure has been reduced, and injecting the fuel to an exhaust manifold 20 at a front end of a catalyst.

Cylinder head 1 and HCI part 10 correspond to general constructions.

Fuel filter 3 includes a filter housing 6 equipped with a filter for filtering foreign substances of the introduced fuel therein, and the filter within filter housing 6 has the same function and operation as those of a general filter.

Meanwhile, damping head 4 forms a layout coupled to an upper side of filter housing 6 forming fuel filter 3, connected to fuel feed line 2, and connected to HCI feed line 9.

Referring to FIG. 2, damping head 4 includes a damping path 5 formed therein, a fuel feed connector 7 communicating fuel feed line 2 connected to damping head 4 with damping path 5, and an HCI feed connector 8 communicating HCI feed line 9 connected to damping head 4 with damping path 5.

Damping path 5 is configured to be controlled by a controller such as an engine control unit (ECU), and the construction of damping path 5 is the same as a general one.

Fuel feed connector 7 and HCI feed connector 8 may have a layout where fuel feed connector 7 and HCI feed connector 8 are formed in various directions in damping head 4.

However, the layout may be formed such that fuel feed connector 7 is horizontally connected to damping head 4 and HCI feed connector 8 is vertically connected to damping head 4 so that fuel feed connector 7 and HCI feed connector 8 are perpendicular to each other.

In particular, fuel feed connector 7 and HCI feed connector 8 may be separately manufactured to be inserted and coupled into damping head 4 or may be integrally and/or monolithically formed with damping head 4.

Meanwhile, damping path 5 includes a fuel supply passage 5a formed in parallel to a longitudinal cross-section of damping head 4 to form a fuel flow passage connected to cylinder head 1, a fuel connecting passage 5b communicated with fuel supply passage 5a and connected to filter housing 6, and an HCI discharge passage 5c communicated with fuel supply passage 5a on an opposite side of fuel connecting passage 5b.

Thus, fuel supply passage 5a is parallel to the longitudinal cross-section of damping head 4, whereas fuel connecting passage 5b and HCI discharge passage 5c are perpendicular to fuel supply passage 5a, respectively.

Accordingly, a fuel pulsation pressure propagates along fuel supply passage 5a in cylinder head 1 and is introduced into filter housing 6, and the fuel pulsation pressure having propagated through an internal circulation path via the filter after being introduced into filter housing 6 may be absorbed and reduced within filter housing 6.

This consequently means that a pulsation pressure far less than a design value propagates in the fuel exiting from filter housing 6 and discharged into HCI discharge passage 5c.

Fuel supply passage 5a is connected to fuel feed line 2 coupled to fuel feed connector 7, and HCI discharge passage 5c is connected to HCI feed line 9 coupled to HCI feed connector 8.

Meanwhile, referring to FIG. 3A, head discharge pressure pulsation A indicates an excessive state where the fuel pulsation pressure exiting from cylinder head 1 and propagating to fuel feed line 2 exceeds a design value, and it can be seen that the excessive head discharge pressure pulsation is directly introduced into fuel filter 3 to which fuel feed line 2 is connected.

However, after being introduced into fuel filter 3, head discharge pressure pulsation A passes through damping head 4 and filter housing 6, and in the process, head discharge pressure pulsation A is converted to stable HCI pressure pulsation B lower than a design value.

Accordingly, if a fuel is discharged to HCI feed line 9, HCI pressure pulsation B remarkably lower than head discharge pressure pulsation A having propagated at an initial state propagates in the discharged fuel.

To this end, referring back to FIG. 2, head discharge pressure pulsation A having entered damping head 4 is introduced into fuel connecting passage 5b along fuel supply passage 5a, and head discharge pressure pulsation A having propagated along fuel connecting passage 5b passes through the filter of filter housing 6.

Head discharge pressure pulsation A having propagated in this way is absorbed, and propagated head discharge pressure pulsation A is converted to remarkably lowered HCI pressure pulsation B.

Then, head discharge pressure pulsation A is an abnormal pulsation pressure exceeding approximately 2.8 bar which is a design value, and HCI pressure pulsation B refers to a normal pulsation pressure not exceeding approximately 2.8 bar which is a design value, wherein 2.8 bar is simply an example for a design value and may be actually varied according to a specification of a hydro-carbon injection supply unit.

As HCI pressure pulsation B having become remarkably lower than head discharge pressure pulsation A having propagated through an interior of filter housing 6 in the above-described way propagates to a fuel exiting from HCI discharge passage 5c while the fuel exits HCI discharge passage 5c, HCI pressure pulsation B is transferred to HCI part 10 together with the fuel via HCI feed line 9.

Subsequently, as the controller controls HCI part 10 depending on a control condition, the fuel having reached HCI part 10 is injected to expedite a reaction between exhaust gas and a catalyst.

Since HCI pressure pulsation B having reached HCI part 10 together with the fuel in the process is a normal pulsation pressure not exceeding approximately 2.8 bar which is a design value, an influence by a high pulsation pressure can be prevented.

Therefore, even if a fuel pulsation pressure exceeding a design value in cylinder head 1 is generated, HCI part 10 can be operated without a bad influence due to a high pulsation pressure.

Since the hydro-carbon injection supply unit according to various embodiments of the present invention includes fuel filter 3 equipped with damping head 4 which reduces a high fuel pulsation pressure generated in cylinder head 1 through an internal circulation path of the fuel, and HCI part 10 for receiving a fuel whose pulsation pressure is reduced and which is discharged from fuel filter 3 and injecting the fuel to an exhaust manifold at a front end of a catalyst, HCI part 10 is not influenced at all even if a fuel pulsation pressure exceeding a design value is generated in cylinder head 1.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydro-carbon injection (HCI) supply unit comprising:
a fuel filter connected to a cylinder head wherein pressure pulsations from the cylinder head propagate from the cylinder head into the fuel filter, wherein the fuel filter includes a damping head to reduce propagated pressure pulsations through an inner circulation path through which incoming fuel passes and is discharged; and
an HCI part to which the reduced propagated pressure pulsations are supplied together with the fuel discharged from the fuel filter, wherein the discharged fuel is injected to of an exhaust manifold at upstream of a catalyst,
wherein the fuel filter includes a filter housing equipped with a filter for filtering foreign substances of the fuel therein, and the damping head is coupled to the filter of the filter housing to be communicated with the filter of the filter housing is connected to a fuel feed line for supplying the fuel to the cylinder head and is connected to an HCI feed line for supplying the fuel to the HCI part,
wherein when a head discharge pressure pulsation generated in the cylinder head propagates, a fuel circulation path for lowering the head discharge pressure pulsation to an HCI pressure pulsation lower than a design value is formed in the damping head, and the fuel circulation path forms a damping path, and
wherein the damping path includes:
a fuel supply passage formed parallel to a longitudinal cross-section of the damping head to form a fuel flow passage;
a fuel connecting passage communicated with the fuel supply passage and connected to the filter housing; and
an HCI discharge passage communicated with the fuel supply passage on an opposite side of the fuel connecting passage.

2. The hydro-carbon injection supply unit as defined in claim 1, wherein the fuel connecting passage and the HCI discharge passage have layouts perpendicular to the fuel supply passage parallel to the longitudinal cross-section of the damping head, respectively.

3. The hydro-carbon injection supply unit as defined in claim 1, wherein the fuel supply passage includes a fuel feed connector for connection of the fuel feed line, and the HCI discharge passage includes an HCI feed connector for connection of the HCI feed line.

4. The hydro-carbon injection supply unit as defined in claim 3, wherein the fuel feed connector is integrally formed with the fuel supply passage, and the HCl feed connector is integrally formed with the HCl discharge passage.

* * * * *